US009117262B2

(12) United States Patent
Lin et al.

(10) Patent No.: US 9,117,262 B2
(45) Date of Patent: Aug. 25, 2015

(54) LEARNED PIECE-WISE PATCH REGRESSION FOR IMAGE ENHANCEMENT

(71) Applicant: Adobe Systems Incorporated, San Jose, CA (US)

(72) Inventors: Zhe Lin, Fremont, CA (US); Xin Lu, University Park, PA (US); Jonathan Brandt, Santa Cruz, CA (US); Hailin Jin, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 218 days.

(21) Appl. No.: 13/691,190

(22) Filed: Nov. 30, 2012

(65) Prior Publication Data

US 2014/0153819 A1 Jun. 5, 2014

(51) Int. Cl.
G06K 9/00 (2006.01)
G06T 5/00 (2006.01)

(52) U.S. Cl.
CPC ....... *G06T 5/002* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 5,867,282 | A * | 2/1999 | Fredlund et al. | 358/450 |
|---|---|---|---|---|
| 6,674,905 | B1 * | 1/2004 | Matsugu et al. | 382/199 |
| 8,260,036 | B2 * | 9/2012 | Hamza et al. | 382/154 |
| 8,385,689 | B2 * | 2/2013 | Chandrashekar et al. | 382/294 |
| 2001/0002932 | A1 | 6/2001 | Matsuo et al. | |
| 2003/0156757 | A1 | 8/2003 | Murakawa et al. | |
| 2005/0281459 | A1 * | 12/2005 | Bala et al. | 382/162 |
| 2011/0206296 | A1 | 8/2011 | Sakaguchi et al. | |
| 2012/0268488 | A1 * | 10/2012 | Masuko | 345/629 |
| 2012/0307116 | A1 * | 12/2012 | Lansel et al. | 348/273 |

OTHER PUBLICATIONS

Buades, et al., "A non-local algorithm for image denoising," pp. 6.
Dabov, et al., "Image denoising by sparse 3D transform-domain collaborative," accepted. to appear in IEEE Transactions on Image Processing, vol. 16, No. 8, Aug. 2007, pp. 1-16.
Elad, et al., "Image Denoising Via Learned Dictionaries and Sparse representation," Department of Computer Science, the Technion— Israel Institute of Technology, Haifa 32000 Israel, pp. 6.

(Continued)

*Primary Examiner* — Thomas Conway
(74) *Attorney, Agent, or Firm* — Kilpatrick Townsend & Stockton LLP

(57) ABSTRACT

Systems and methods are provided for providing learned, piece-wise patch regression for image enhancement. In one embodiment, an image manipulation application generates training patch pairs that include training input patches and training output patches. Each training patch pair includes a respective training input patch from a training input image and a respective training output patch from a training output image. The training input image and the training output image include at least some of the same image content. The image manipulation application determines patch-pair functions from at least some of the training patch pairs. Each patch-pair function corresponds to a modification to a respective training input patch to generate a respective training output patch. The image manipulation application receives an input image generates an output image from the input image by applying at least some of the patch-pair functions based on at least some input patches of the input image.

14 Claims, 9 Drawing Sheets

(56) References Cited

OTHER PUBLICATIONS

Freeman, et al., "Example-Based Super-Resolution," Image-Based Modeling, Rendering, and Lighting, Mitsubishi Electric Research Labs, Mar.-Apr. 2002, pp. 56-65.

Joshi, et al., "Personal Photo Enhancement Using Example Images," ACM Transactions on Graphics, 29(2), Article 12, Mar. 2010, pp. 1-15.

Kervrann, et al., "Optimal Spatial Adaptation for Patch-Based Image Denoising," IEEE Transactions on Image Processing, 15(10), Oct. 2006, pp. 2866-2878.

Roth, et al., "Fields of Experts," International Journal of Computer Vision, Accepted Nov. 17, 2008, pp. 1-25.

Tomasi, et al., "Bilateral Filtering for Gray and Color Images," Proceedings of the 1998 IEEE International Conference on Computer Vision, Bombay, India, 1998, pp. 8.

Wang, et al., "Adaptive Image-based Intersection Volume," pp. 9.

Yang, et al., "Couple Dictionary Training for Image Super-Resolution," IEEE Transactions on Image Processing, Mar. 13, 2012, pp. 1-27.

Kervrann, Charles, et al., Bayesian Non-Local Means Filter, Image Redundancy and Adaptive Dictionaries for Noise Removal, Scale Space and Variational Methods in Computer Vision, Springer Berline Heidelber, 2007, 12 pages.

* cited by examiner

LEARNED PIECE-WISE PATCH REGRESSION FOR IMAGE ENHANCEMENT

TECHNICAL FIELD

This disclosure relates generally to computer-implemented methods and systems and more particularly relates to providing learned, piece-wise patch regression for image enhancement.

CROSS-REFERENCE TO RELATED APPLICATION

U.S. patent application Ser. No. 13,691,212, entitled "Patch Size Adaptation for Image Enhancement", filed on the same day as the present application and naming Zhe Lin, Xin Lu, Jonathan Brandt, and Hailin Jin as inventors, is incorporated by reference herein in its entirety.

BACKGROUND

Image manipulation programs are used to modify or otherwise use image content captured using a camera. For example, an image manipulation program can remove or decrease noise from (i.e., de-noise) image content captured using the camera. An image manipulation program can also remove or decrease blurring in image content captured using the camera. Noise can be caused by, for example, capturing images in low light conditions with low-end cameras. Low-end cameras may include image sensors having a high sensitivity to light conditions. Increasing the sensitivity to light conditions can add noise to image content captured with the camera.

Existing solutions for de-noising image content can improve the quality of image content. One existing solution is a non-local means algorithm. A non-local means algorithm can average pixel values in image patches (i.e., portions of the input image) of a noisy image using weighted averages. The non-local means algorithm can identify a given patch of the noisy image as a subject patch. Pixel values are averaged for image patches that are similar to the subject image patch. Averaging the pixel values can reduce the effect of noise in the input image.

Another existing solution is a block-matching and three-dimensional filtering ("BM3D") algorithm that groups similar patches and performs collaborative filtering. A BM3D algorithm selects all similar patches for an input image and divides the similar patches into groups. For each group, collaborative filtering is performed. A "clean" (i.e., de-noised) image can be re-constructed from the filtered patches. However, among other deficiencies, existing solutions for image de-noising use a single image as an input image and perform de-noising operations on the single image. Using a single input image can cause undesirable blurring of features within a replacement patch.

SUMMARY

One embodiment involves an image manipulation application generating training patch pairs that include training input patches and training output patches. Each training patch pair includes a respective training input patch from a training input image and a respective training output patch from a training output image. The training input image and the training output image include at least some of the same image content. The embodiment further involves determining patch-pair functions from at least some of the training patch pairs. Each of the patch-pair functions corresponds to a modification to a respective training input patch to generate a respective training output patch. The embodiment further involves receiving an input image. The embodiment further involves generating an output image from the input image by applying at least some of the patch-pair functions based on at least some input patches of the input image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
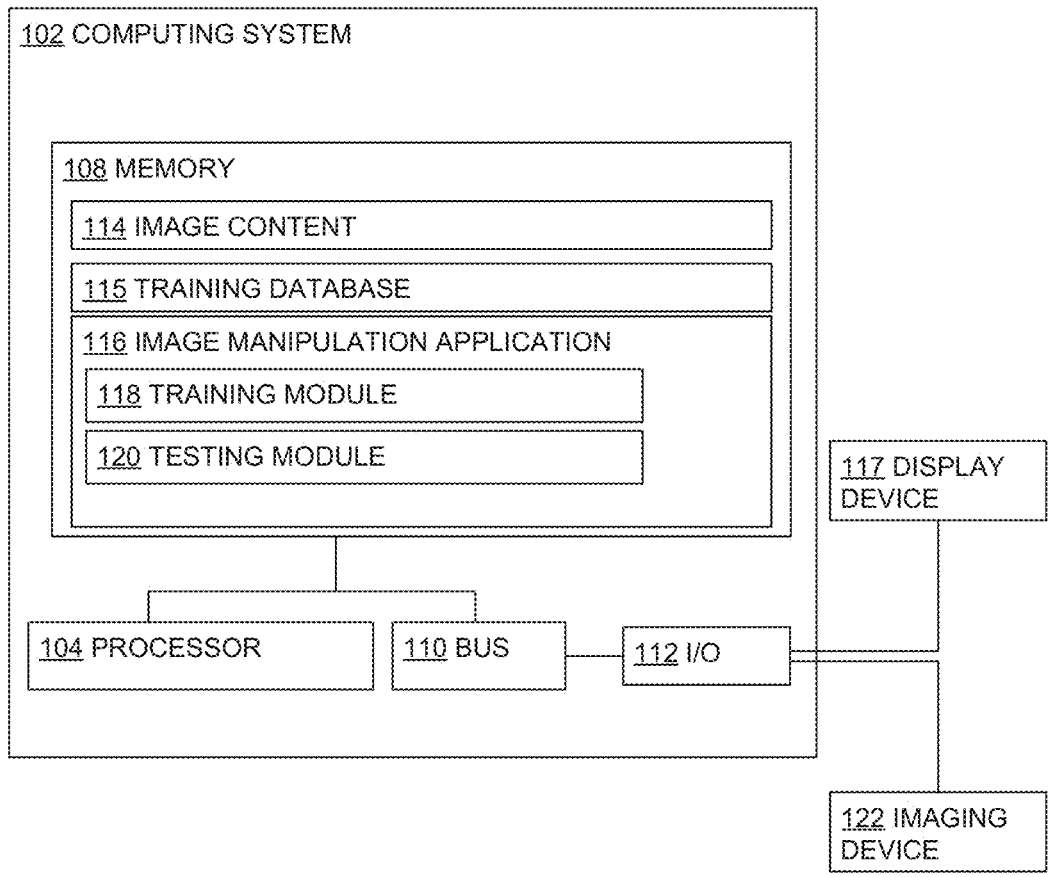
FIG. 1 is a block diagram depicting an example computing system for implementing certain embodiments.

Computer-implemented systems and methods are disclosed for providing learned, piece-wise patch regression for image enhancement. For example, an image manipulation application can be trained to determine a function for transforming a noisy image into a clean image using a database of example training image patches. The patches are portions of the images, such as portions having dimensions of five pixels by five pixels, used for analyzing the image in a piece-wise manner. The training image patches can include multiple pairs of noisy patches and corresponding "clean" patches having little or no noise. The image manipulation application can determine functions, such as regression functions, describing the relationship between at least some of the noisy patches and the corresponding clean patches. The image manipulation application can use the regression functions learned from the database of example training image patches to remove noise from an input image. Using a database of example patch pairs to train the image manipulation application provides better image improving functions and offers various benefits. For example, de-noising or otherwise enhancing an input image can be performed with minimal or reduced blurring of the input image. De-noising an image using functions learned from example patch pairs may, in fact, greatly reduce the amount of blur present in the input image.

The following non-limiting example is provided to help introduce the general subject matter of certain embodiments. An image manipulation application is used to de-noise a noisy image of an oak tree. The image manipulation application identifies or creates an appropriate function or functions to perform de-noising by learning from a library of training image patch pairs that include noisy patches and corresponding clean patches. The image manipulation application uses a learned relationship between the noisy patch and the clean patch to identify or create an appropriate function or functions to de-noise the image patches similar to the noisy patch. For a given patch of the noisy image of the oak tree, the image manipulation application identifies a learned de-noising function that is associated with a similar training noisy/clean patch pair. The image manipulation application applies the learned de-noising function to de-noise an image patch of the noisy image of the oak tree. In a similar manner, appropriate functions for all patches of the image of the oak tree can be selected and used to de-noise the noisy image of the oak tree.

Selecting a function for de-noising a patch by identifying a function associated with de-noising a similar patch in similar images provides certain advantages over trying to identify a function without using other images. Using learned, piece-wise patch regression for image enhancement and other de-noising operations can leverage diverse variation of image content from a large set of patches often present in natural images. The image manipulation application using learned, piece-wise patch regression for image enhancement can generate clean results from noisy images while preserving details in complicated texture areas. The image manipulation application using learned, piece-wise patch regression can also provide improved sharpening of details in de-noised images as compared to de-noising solutions using single image de-noising. Piece-wise modeling of a patch-pair functions between input and output training patch spaces can allow for effective modeling of the underlying enhancement operation. Piece-wise modeling of a patch-pair functions between input and output training patch spaces can increase the efficiency of and accuracy of de-noising or otherwise enhancing an image. Piece-wise modeling of a patch-pair functions can increase accuracy of an output image by generating de-noising rules from large numbers of training patch examples in natural images and can decrease the use of expensive patch distance computations and averaging.

In accordance with one embodiment, an image manipulation application generates multiple training patch pairs. The training patch pairs include multiple training input patches, such as noisy patches, and multiple training output patches, such as clean patches. Each training patch pair includes a training input patch from a training input image and a training output patch from a training output image. The training input image and the training output image include at least some of the same image content. For example, a training input that is a noisy image can be generated by applying noise to a training output image that is a noise-free image captured by a high-quality imaging device.

The image manipulation application can include a training module and a testing module. The training module can access an external database in which the patch pairs are stored. The training module of the image manipulation application determines multiple patch-pair functions from at least some of the training patch pairs. Each patch-pair function corresponds to a modification to a respective training input patch to generate a respective training output patch. For example, a patch-pair function may be a regression function that models or otherwise represents a relationship between a noisy patch from a test input image and a clean patch from a test output image. The testing module can de-noise or otherwise enhance an input image using the learned patch-pair functions. The testing module receives an input image and generates an output image from the input image by applying, for at least some of the input patches for the input image, a corresponding patch-pair function. For example, the testing module can apply learned regression functions to noisy input patches of an input image to generate corresponding clean patches with the noise reduced or eliminated. The testing module reconstructs the clean image from the clean patches.

As used herein, the term "patch" is used to refer to a partitioned portion of image content. An image can be partitioned into multiple patches of equal size that overlap one another. Non-limiting examples of patch sizes include 5 pixels×5 pixels, 7 pixels×7 pixels, and 10 pixels×10 pixels. A suitable patch size can provide a pixel-level correspondence between a training input patch, such as a noisy patch, and a training output patch, such as a clean patch having little or no noise distortion.

As used herein, the term "image content" is used to refer to any image that can be rendered for display or use at a computing system or other electronic device. Image content can include still images, video, or any combination thereof.

As used herein, the term "noise" is used to refer to random data added to image content that distorts the image content. Noise can be added to image content due to thermal noise or other noise experienced by an optical sensor of an imaging device, such as a camera.

In additional or alternative embodiments, the image manipulation application can generate the training patch pairs from one or more high quality images to be used as test output images. A high quality image can include an image without noise or blurring, such as an image captured using an imaging device having an image sensor with low thermal noise. The image manipulation application can add noise to each image. The noise to be added from each image can be obtained by applying a de-noising algorithm to a uniform test image captured using a test imaging device having an image sensor that is sensitive to noise. Noise can be extracted from the uniform test image using the de-noising algorithm. The noise can be added to the one or more high quality images to generate one or more test input images. The image manipulation application or another application can partition each of the test input images and corresponding test output images to obtain the training input patches the training output patches.

In additional or alternative embodiments, the image manipulation application can identify anchor points used for determining patch-pair functions in order to reduce the computational intensity for processing subsequent input images. An anchor points is a point in a Euclidean space, such as an x-y plane that correspond to or otherwise represents a group of training input patches that can be represented as points in the x-y plane close to the anchor point. The closeness of the anchor point and the group of training input patches in the x-y plane is representative of similarities in pixel values for the training input patches and the anchor point. A patch-pair function determined for an anchor point representing a group of training input patches can provide de-noising results of similar quality for each of the represented training input patches. The image manipulation application partitions or otherwise clusters the training input patches into groups (or "clusters") of training input patches. The image manipulation application determines anchor points for the groups. Each anchor point represents a respective group of training input patches. The image manipulation application determines a respective patch-pair function, such as a regression function, for each of the anchor points and the training output patches corresponding to the respective anchor points. Each patch-pair function generated for an anchor point can be used to de-noise image patches from subsequent input images that are similar to the training input images.

In some embodiments, partitioning the training input patches into groups of training input patches includes using any suitable algorithm for large-scale vector quantization or clustering of groups of training input patches. A non-limiting example of a suitable algorithm for large-scale clustering of groups of training input patches is hierarchical clustering. Hierarchical clustering includes generating a hierarchy of training input patches. The hierarchy can have a depth factor specifying a number of levels in the hierarchy and a branch factor specifying the number of branches from each node at a level of the hierarchy. Generating the hierarchy can include, for each level in the hierarchy, determining multiple centroids for the training input patches at that level. Each centroid is representative of a respective subset of the training input patches that are closest to the centroid. Each training input patch and each centroid can be represented by a multi-dimensional vector, such as (but not limited to) a 25×1 vector. The number of centroids for each level is based on the branch factor for the hierarchy. Determining the anchor point can include traversing clusters of training input patches to obtain a nearest anchor point. Traversing clusters of training input patches can be performed using any suitable algorithm for exact or approximate nearest neighbor search. For hierarchical clustering, a hierarchical tree itself can allow for a nearest anchor point search. Determining the anchor points can include selecting the leaf nodes from the hierarchy. Applying the patch-pair functions can include determining a respective anchor point closest to each input patch and applying a corresponding patch-pair for the anchor point to the input patch.

As used herein, the term "centroid" is used to refer to a point in a two-dimensional space that is the geometric center for the two-dimensional space. The vectors used to depict training input patches can be represented in a two-dimensional space, such as an x-y plane. For each level in the hierarchy, the x-y plane can be recursively bisected into quadrants. At each level of recursion, the centroid for each bisected region can be selected as an anchor point for the training input patches in the bisected region.

The training module of the image manipulation application can determine or otherwise identify appropriate/similar patch-pair functions using any suitable algorithm. In some embodiments, the training module can identify the patch-pair functions by applying a least squares algorithm to determine a relationship between each anchor point and a corresponding training output patch. The relationship between each anchor point and a corresponding training output patch can be represented as a regression function or other suitable patch-pair function describing the relationship between, for example, a noisy image patch and a clean image patch. In other embodiments, the training module can determine the patch-pair functions by applying a non-negative least squares algorithm to determine the relationship between each anchor point and a corresponding training output patch.

In additional or alternative embodiments, de-noising methods and systems described herein can be performed for different color spaces. For images with luminance noise only, the image manipulation application can convert an input image from an RGB color space into a YCbCr color space, de-noise the luminance ("Y") channel, and use the de-noised Y channel to convert the input image to the RGB color space. For images with color noise, the image manipulation application can be trained using converted grayscale image patches and perform regression separately on each RGB channel using the same regression function.

Referring now to the drawings, FIG. 1 is a block diagram depicting an example computing system 102 for implementing certain embodiments.

The computing system 102 comprises a computer-readable medium such as a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interface 112, a display device 117, and an imaging device 122. A bus 110 can also be included in the computing system 102. The bus 110 can communicatively couple one or more components of the computing system 102.

The computing system 102 can modify, access, or otherwise use image content 114. The image content 114 may be resident in any suitable computer-readable medium and execute on any suitable processor. In one embodiment, the image content 114 can reside in the memory 108 at the computing system 102. In another embodiment, the image content 114 can be accessed by the computing system 102 from a remote content provider via a data network.

A non-limiting example of an imaging device 122 is a camera having an energy source, such as a light emitting diode ("LED"), and an optical sensor. An imaging device 122 can include other optical components, such as an imaging lens, imaging window, an infrared filter, and an LED lens or window. In some embodiments, the imaging device 122 can be a separate device configured to communicate with the computing system 102 via the I/O interface 112. In other embodiments, the imaging device 122 can be integrated with the computing system 102. In some embodiments, the processor 104 can cause the computing system 102 to copy or transfer image content 114 from memory of the imaging device 122 to the memory 108. In other embodiments, the processor 104 can additionally or alternatively cause the computing system 102 to receive image content 114 captured by the imaging device 122 and store the image content 114 to the memory 108.

The memory 108 can include any suitable computer-readable medium. A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

An image manipulation application 116 stored in the memory 108 can configure the processor 104 to modify the image content 114. In some embodiments, the image manipulation application 116 can be a software module included in or accessible by a separate application executed by the processor 104 that is configured to modify, access, or otherwise use the image content 114. In other embodiments, the image manipulation application 116 can be a stand-alone application executed by the processor 104.

The image manipulation application 116 can include one or more modules, such as (but not limited to) a training module 118 and a testing module 120. The training module 118 can configure the processor 104 to analyze image patch pairs from a training database 115 to determine one or more functions modeling the relationship between training input images and training output images, as described in further detail below. In some embodiments, the training database 115 can be stored in the memory 108, as depicted in FIG. 1. In other embodiments, the training database 115 can be stored at a remote system accessible by the computing system 102 via a data network. The testing module 120 can configure the processor 104 to modify an input image using the one or more functions determined by the training module 118, as described in further detail below.

Although FIG. 1 depicts the training module 118 and the testing module 120 as separate modules, the features provided by one or more of the modules can be provided by a single software module of the image manipulation application 116. Although FIG. 1 depicts the training module 118 and the testing module 120 as modules of the image manipulation application 116, one or more of the training module 118 and the testing module 120 can be separate applications accessed or otherwise used by the image manipulation application 116.

The computing system 102 can include any suitable computing device for executing the image manipulation application 116. Non-limiting examples of a computing device include a desktop computer, a tablet computer, a smart phone, a digital camera, or any other computing device suitable for rendering the image content 114.

Figure 2:
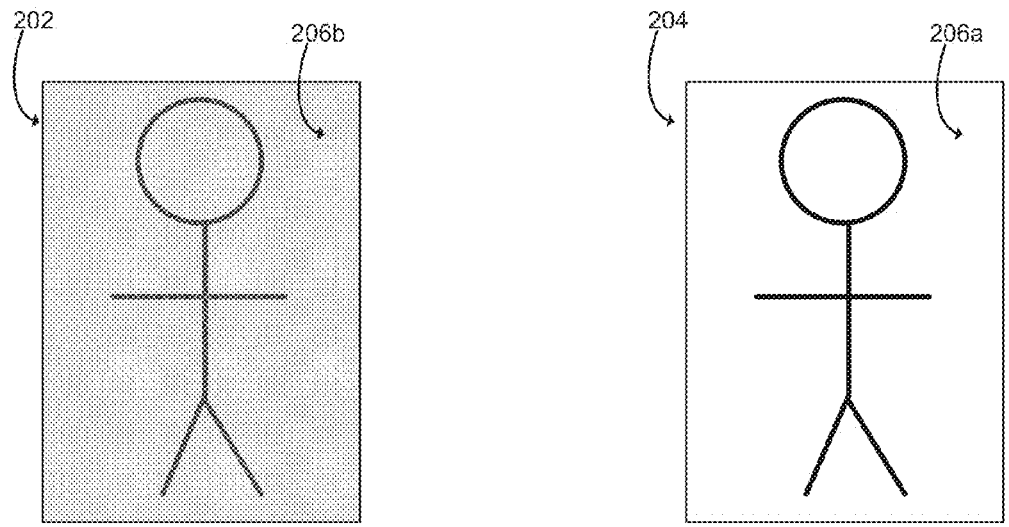
FIG. 2 is a modeling diagram illustrating a training input image and a corresponding training output image.

The training database 115 can include training patch pairs obtained from one or more training input images, as depicted in FIGS. 2-5. FIG. 2 is a modeling diagram illustrating a training input image 202 and a corresponding training output image 204. A non-limiting example of a training input image 202 is a noisy version of a training output image 204. The training output image 204 can include image content 206a. The training input image 204 can include, for example, image content 206b that includes the image content 206a distorted by added noise. For simplicity, the noise in FIG. 2 is depicted as diagonal lines blurring the image content 206b of the training input images 202. However, any modification of the image content 206a, including additive random noise or blurring from a camera shake, can be used with the present innovations.

Figure 3:
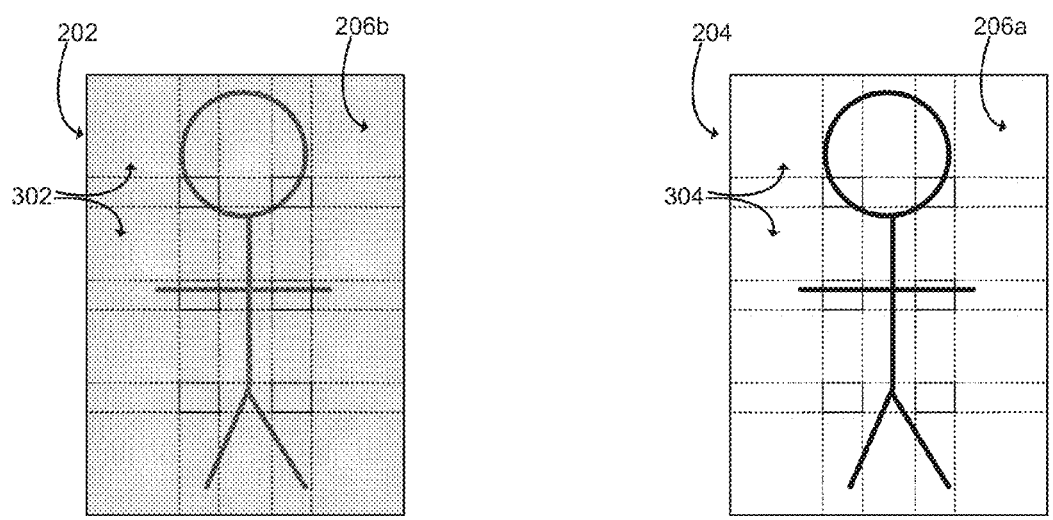
FIG. 3 is a modeling diagram depicting a training input image having training input patches and a training output image having training output patches.

FIG. 3 is a modeling diagram depicting a training input image 202 having training input patches 302 and a training output image 204 having training output patches 304. Each of the training input patches 302 corresponds to a respective one of the training output patches 304. The training input patches 302 of the training input image 202 can overlap one another. The corresponding training output patches 304 of the training output image 204 can overlap one another.

For simplicity, FIG. 3 depicts twelve overlapping patches for each of the training input image 202 and the training output image 204. However, an image can be partitioned into any number of patches. For example, an image can be partitioned into overlapping patches of sizes such as 5 pixels×5 pixels, 7 pixels×7 pixels, and 10 pixels×10 pixels. Hundreds, thousands, or millions of patch pairs can be included in a training database 115.

Figure 4:
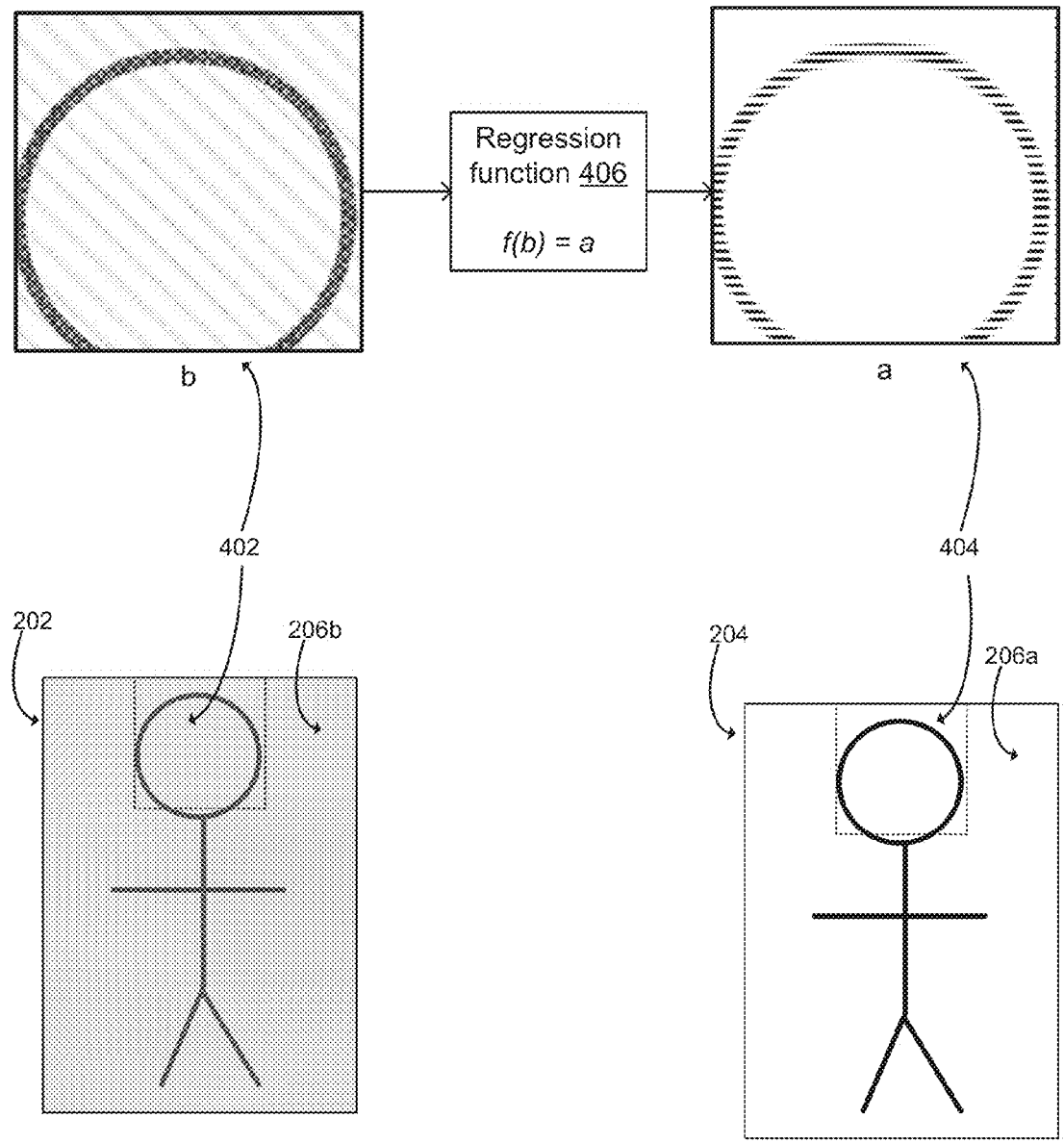
FIG. 4 is a modeling diagram depicting an example relationship between a training input patch and a training output patch.

FIG. 4 is a modeling diagram depicting an example relationship between a training input patch 402 and a training output patch 404. For a training input image 202 that is a noisy version of the training output image 204, the training module 118 can determine a regression function 406 modeling the relationship between the training input patch 402 and the training output patch 404. The regression function 406 is depicted in FIG. 4 as f(b)=a, where b represents the training input patch 402 and a represents the training output patch 404.

In a non-limiting example, a training input image 202 and a training output image 204 can be divided into training input patches 302 and training output patches 304. The image manipulation application 116 can group one of the training input patches 302 and a corresponding one of the training output patches 304 into a respective patch pair. Each patch can be represented using a numerical vector by, for example, concatenating the intensity values for the pixels in the patch. For example a patch size of 5 pixels×5 pixels can be represented as a 25×1 vector. The training module 118 can determine or otherwise learn a relationship matrix represented by a regression function 406 that maps a vector representing each training input patch to a vector representing a corresponding training output patch. The process can be repeated to find regression functions for vectors representing multiple training patch pairs. The testing module 120 can use the regression functions to remove noise or other distortion from a new input image received by the image manipulation application 116.

As depicted in FIG. 3, an image can be divided into multiple overlapping patches. Each of multiple overlapping patches for an input image can be associated with different regression functions learned or otherwise determined by the training module 118. For an input image portion that includes multiple overlapping input patches associated with multiple regression functions, the testing module 120 can apply each regression function to the input image portion to obtain multiple predicted output patches for the image portion. The testing module 120 can average the multiple predicted output patches to obtain a clean version of the image portion.

Figure 5:
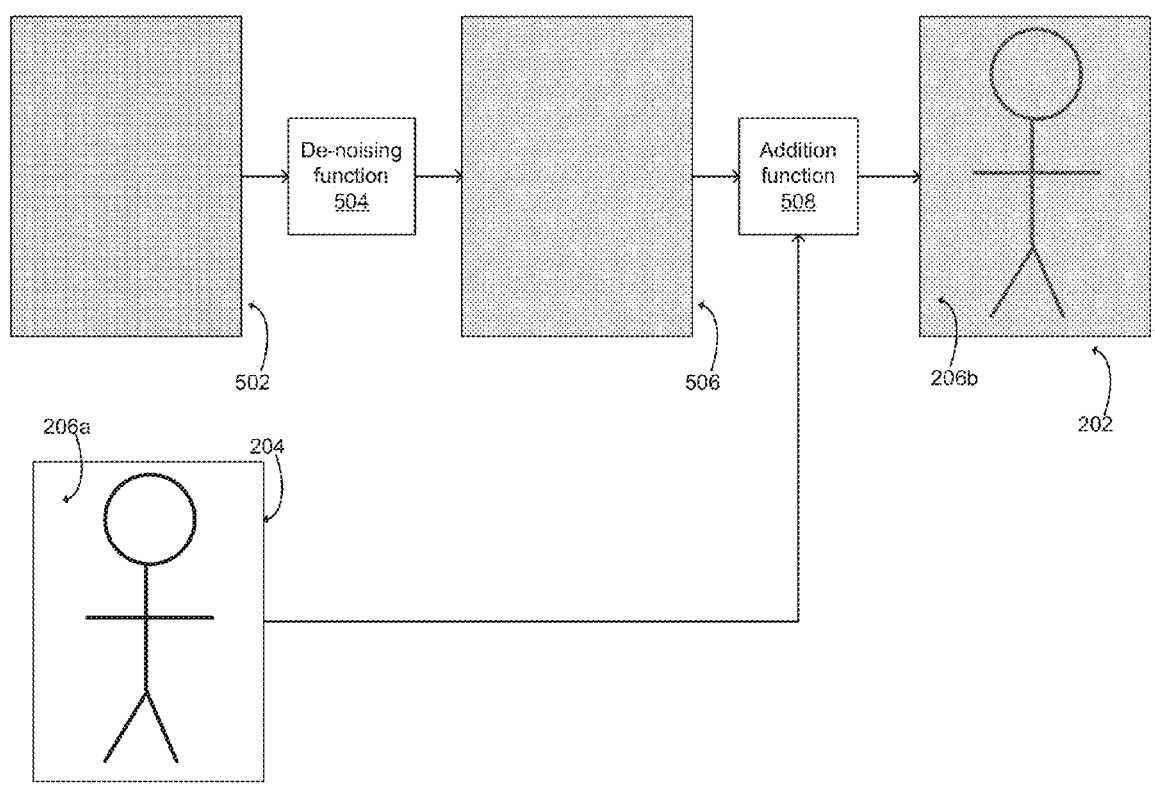
FIG. 5 is a modeling diagram depicting an example process for generating a training input image.

The noise to be added to a clean image can be obtained by applying a de-noising algorithm to a noisy input image, such as a uniform test image, to obtain a clean image and subtracting the clean image from the noisy input image. For example, FIG. 5 is a modeling diagram depicting an example process for generating a training input image 202.

In some embodiments, the noise 506 can be real noise obtained by using a low-quality imaging device, such as a camera having an image sensor that is sensitive to noise. A uniform image 502 can be captured using an imaging device that adds noise or other distortion onto captured image content. The uniform image 502 can be, for example, a white surface having uniform content throughout the image. The training output image 204 can be captured using an imaging device that adds little or no noise or other distortion onto the captured image content 206a.

A de-noising function 504 can be applied to the uniform image 502 to extract the noise 506 from the image 502. Although the noise 506 is depicted for simplicity in FIG. 5 as a series of diagonal lines, the noise 506 can include random distortion of the uniform image 502. The noise 506 and the training output image 204 can be provided as inputs to an addition function 508. The addition function 508 can distort the image content 206a using the noise 506 to generate the training input image 202.

In other embodiments, synthetic noise, such as (but not limited to) Gaussian noise can be added to image content 206a of a training output image 204 to obtain a training input image 202.

In additional or alternative embodiments, a high-quality imaging device can be used to capture a training output image 204 and a low-quality imaging device can be used to capture a training input image 202. The high-quality imaging device and the low-quality imaging device can capture an image of the same object, such as the figure depicted in training input image 202 and training output image 204. The training input image 202 and the training output image 204 can be registered together such that pixels corresponding to the same object in each image are aligned with one another. In cases where pixel-level registration is difficult due to the light, scale, rotation, or other slight differences between the images generated by a low-end camera and a high-end camera, embodiments can be used that do not involve pixel-level registration.

Figure 6:
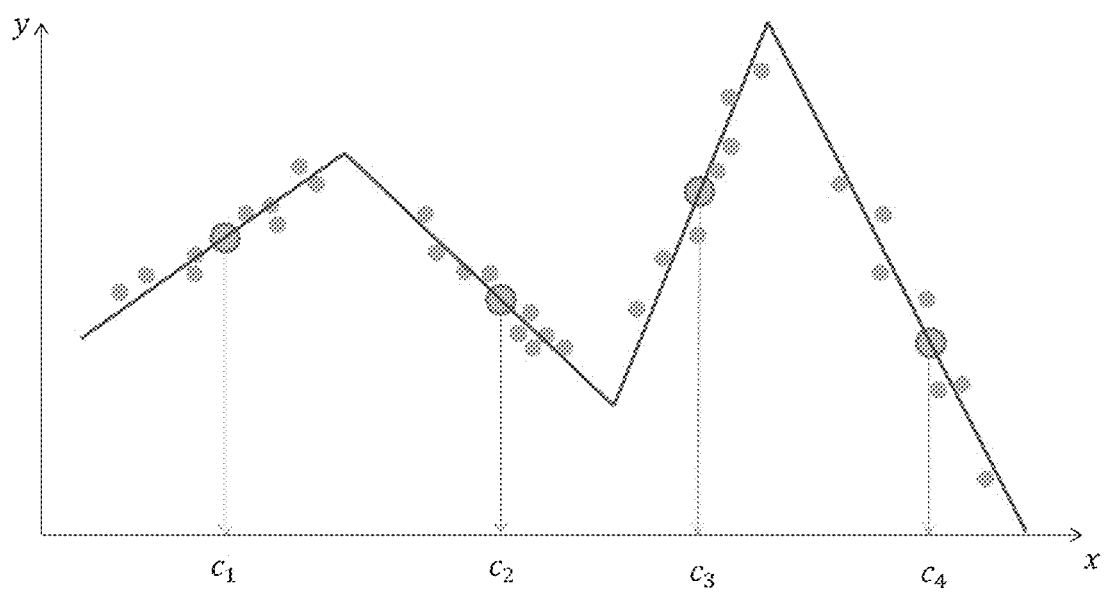
FIG. 6 is a graph depicting the selection of a subset of training input patches as anchor points.
Figure 7:
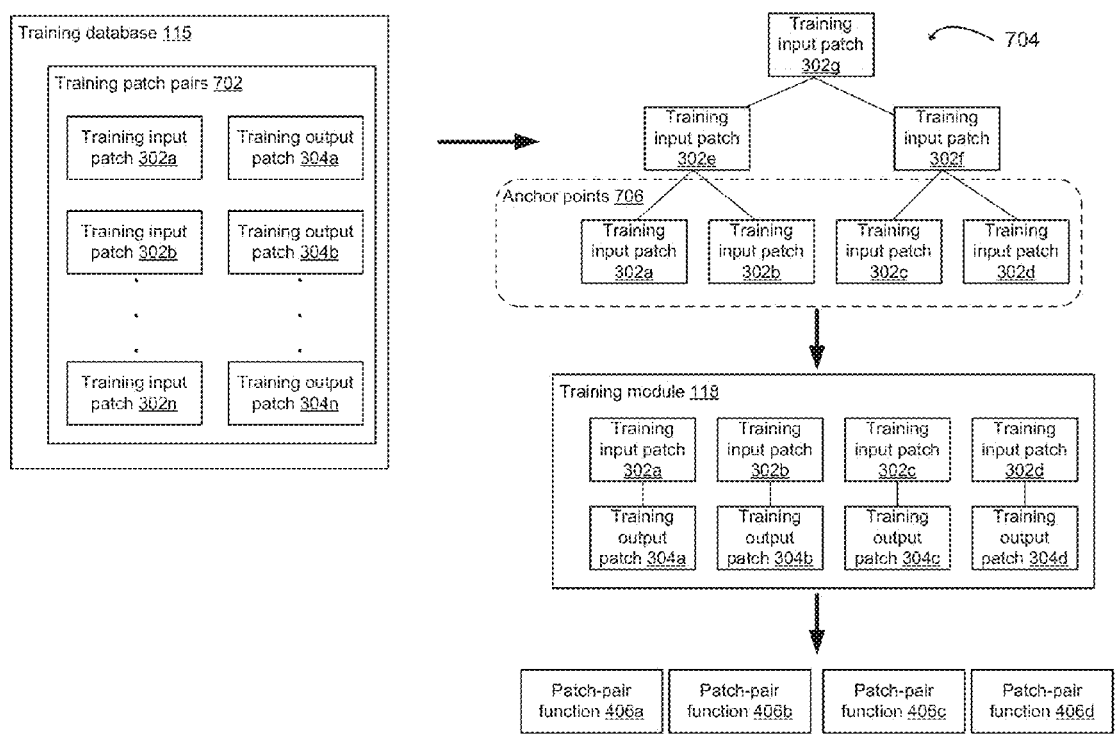
FIG. 7 is a modeling diagram depicting a selection of anchor points by clustering training input patches using a hierarchy.

The training module 118 can use training input patches 302 and training output patches 304 to determine one or more patch-pair functions, as depicted in FIGS. 6-7. FIG. 6 is a graph depicting the selection of a subset of the training input patches 302 as anchor points. Each of the training input patches 302 is depicted in a two-dimensional space represented by the x-y axes. The anchor points $c_1 \ldots c_4$ can correspond to the centroids of the training input patches 302 as depicted in the x-y plane. FIG. 6 depicts anchor points $c_1 \ldots c_4$ determined for a single layer of clustering.

FIG. 7 is a modeling diagram depicting a selection of anchor points 706 by clustering training input patches 302a-n using a hierarchy 704. The image manipulation application 118 can access the training patch pairs 702 from the training database 115. The training patch pairs 702 can include the training input patches 302a-n corresponding to the training output patches 304a-n.

The image manipulation application 118 can cluster the training input patches 302a-n into a hierarchy 704 using hierarchical clustering. The leaf nodes of the hierarchy 704 can be selected as the anchor points 706. The training module 118 can determine the patch-pair functions 406a-d using the training patch pairs 302a-d and the corresponding training output patches 304a-d. The patch-pair function 406a can model the relationship between the training input patch 302a and the training output patch 304a. The patch-pair function 406b can model the relationship between the training input patch 302b and the training output patch 304b. The patch-pair function 406c can model the relationship between the training input patch 302c and the training output patch 304c. The patch-pair function 406d can model the relationship between the training input patch 302d and the training output patch 304d.

In a non-limiting example, the training module 118 can build a hierarchy by executing a hierarchical k-means algorithm. Using a hierarchy can account for a large variation of noisy patches in the training database 115. The hierarchical k-means algorithm can generate N centroids ($c_1, c_2, \ldots, c_N$) for the N groups (or "clusters") of training input patches. Each centroid can be an anchor point for a respective cluster.

The root level of the hierarchy corresponds to the entire set of vectors representing the training input patches 302a-n. The set of vectors representing the training input patches 302a-n can include, for example, one million 25×1 vectors. The training module 118 can apply a k-means algorithm to partition the one million 25×1 vectors into groups of vectors. The training module 118 can determine a centroid for the one million 25×1 vectors represented in an x-y plane. The training module 118 can select the centroid for the one million 25×1 vectors as the root node of the hierarchy. The training module 118 can partition the x-y plane by, for example, dividing the x-y plane into four quadrants (i.e., k=4) based on the centroid. The training module 118 can determine a respective centroid for each of the four quadrants. The training module 118 can select the four centroids as child nodes of the root node. The training patches represented by vectors in the x-y plane closest to each centroid are grouped with the node corresponding to the centroid in the hierarchy such that the centroid represents the group of training patches. The training module 118 can continue recursively partitioning the x-y plane based on the centroids at each level of the hierarchy to continue generating the hierarchy. The training module 118 can cease recursion in response to the hierarchy having a number of levels corresponding to a depth factor for the hierarchy.

The training module 118 can select the leaf nodes of the hierarchy as the anchor points. The training module 118 can determine a regression function for each of the anchor points by mapping a vector representing the anchor point to a vector representing a training output patch.

For example, a training output patch, such as a clean patch, can be associated with a corresponding anchor point via an objective function such as $$f = \arg\min \Sigma_{i=1}^{K} \|x_i - \hat{x}_i\|_2^2,$$

where K represents the number of samples on the anchor point, $x_i$ represents the clean patch, and $\hat{x}_i$ represents the predicted patch.

The training module 118 can solve the objective function via any suitable means, such as (but not limited to) a least square algorithm or a non-negative least square algorithm. A least square algorithm or a non-negative least square algorithm can determine a relationship between a respective one of the training input patches falling into one group represented by an anchor point and a corresponding training output patch.

The training module can estimate $x_i$ for a least square algorithm to obtain the objective function $$f = \arg\min \Sigma_{i=1}^{K} \|x_i - B - Wy_i\|_2^2,$$

where $\hat{x}_i = f(y_i) \approx B + Wy_i$, $y_i$ is the noisy patch.

The training module 118 can estimate $x_i$ for a non-negative least square algorithm to obtain the objective function $$f = \arg\min \Sigma_{i=1}^{K} \|x_i - Wy_i\|_2^2 \text{ s.t., } W \geq 0,$$

where $\hat{x}_i = f(y_i) \approx Wy_i$, $y_i$ is the noisy patch.

In additional or alternative embodiments, a normalization function or other pre-processing can be performed on each training input patch in order to reduce the complexity of the patch. A training input patch for a training input image can include diverse features within the training input patch. For example, a patch taken from an edge or texture of an image can include diverse features. The image manipulation application 116 can reduce the complexity of each training input patch by subtracting a mean value from the training input patch prior to clustering training input patches. In some embodiments, after mean subtraction, the image manipulation application 116 can normalize each training input patch by dividing the variance for each training input patch. The mean of the patch can be computed as the average of pixel intensities inside the patch. The variance can be computed as the variance of pixel intensities inside the patch. In additional or alternative embodiments, other suitable patch normalization methods (such as, but not limited to. gradient patch) can be used that reduce patch complexity and allow an original patch can be reconstructed based on the normalized patch. In some embodiments, normalization can be performed on a raw patch for the training and test input image patches. In other embodiments, normalization can be performed on a pre-processed patch after running a single-image-based de-noising algorithms such as non-local means to avoid sensitivity to noise during mean and variance calculations.

Although FIGS. 6 and 7 depict hierarchical clustering of training input patches, any suitable algorithm for clustering the training input patches can be used. A suitable algorithm for clustering the training input patches can partition an x-y plane in which anchors points representing respective clusters of the training input patches can be depicted and select a suitable representative vector for a cluster of training input patches. Other non-limiting examples of suitable clustering algorithms include k-means clustering, approximate k-means clustering, agglomerative clustering, etc. The suitability of a clustering algorithm can be based on the efficiency of the clustering algorithm with respect to the numbers of training input patches.

Figure 8:
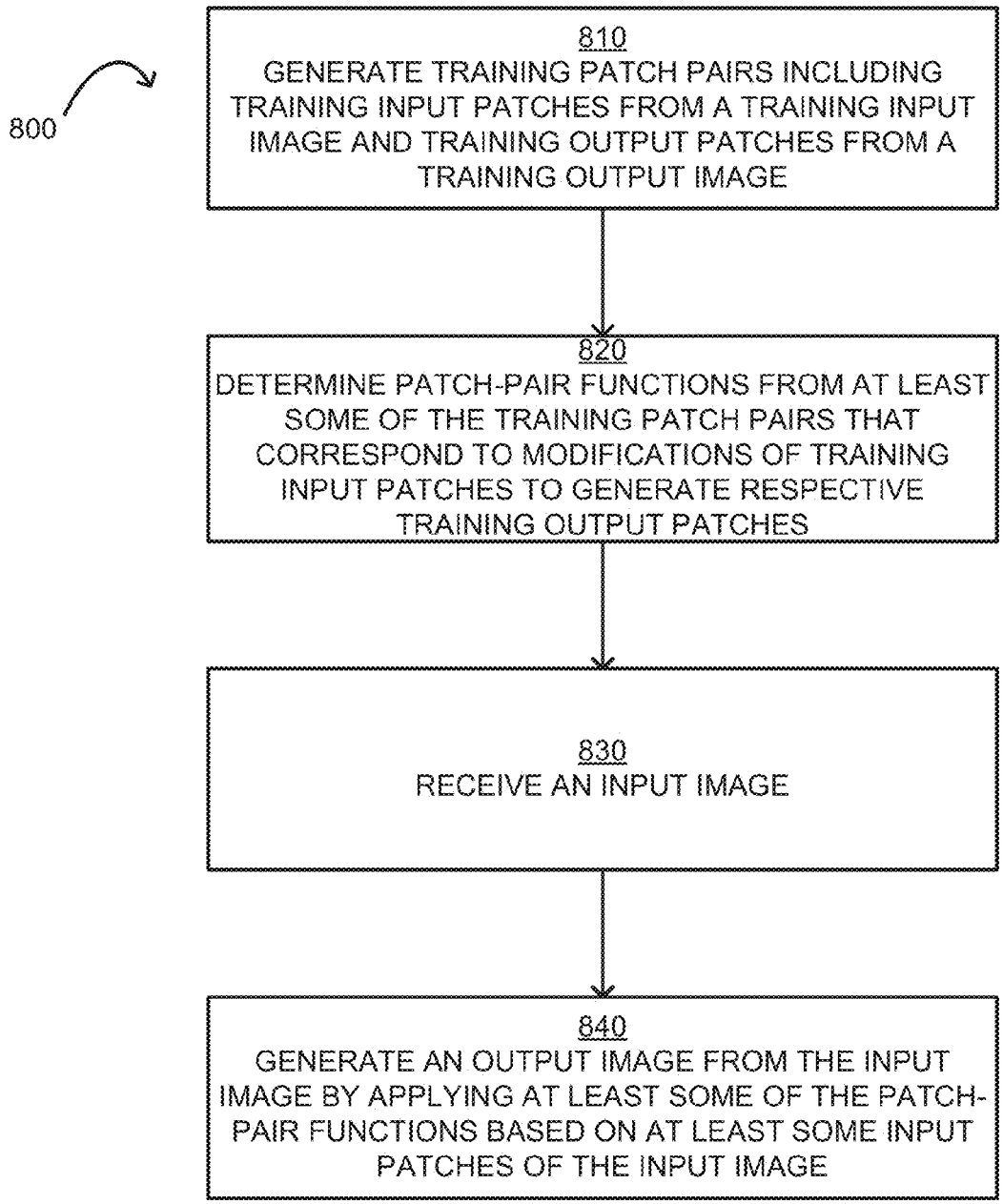
FIG. 8 is a flow chart illustrating an example method for providing learned piece-wise patch regression for image enhancement.

FIG. 8 is a flow chart illustrating an example method 800 for providing learned piece-wise patch regression for image enhancement. For illustrative purposes, the method 800 is described with reference to the system implementation depicted in FIG. 1. Other implementations, however, are possible.

The method 800 involves generating multiple training patch pairs 702 that include training input patches and training output patches, as shown in block 810. The processor 104 of the computing system 102 can execute the image manipulation application 116 or another application or software module to generate the training patch pairs 702. The training patch pairs 702 can be stored in the training database 115. The training patch pairs 702 include, for example, the training input patches 302a-n from a training input image 302 and a training output patch from a training output image 302.

The method 800 further involves determining patch-pair functions, such as the patch-pair functions 406a-d, from at least some of the training patch pairs 702, as shown in block 810. The processor 104 of the computing system 102 can execute the training module 118 of the image manipulation application 116 to estimate or otherwise determine patch-pair functions. Each of the patch-pair functions corresponds to a modification to a respective training input patch to generate a respective training output patch. For example, the patch-pair functions 406a-d can respectively correspond to the modifications of training input patches 302a-d to obtain the training output patches 304a-d.

In some embodiments, the training module 118 can determine the patch-pair functions as described above with respect to FIGS. 6-7. The training module 118 can perform operations such as partitioning the training input patches into groups or clusters of training input patches, determining anchor points, representing the groups of training input patches, and determining patch-pair function for each of the anchor points. The training module 118 can partition or otherwise cluster the training input patches into groups by generating a hierarchy 704. The training module 118 can select leaf nodes of the hierarchy 704 as the anchor points.

The method 800 further involves receiving an input image, as shown in block 830. The processor 104 of the computing system 102 can execute the image manipulation application 116 to receive the input image. In some embodiments, the training input image can be captured by an imaging device 122 and provided to the processor 104. In other embodiments, the processor 104 can access an input image stored in the memory 108.

The method 800 further involves generate an output image from the input image by applying at least some of the patch-pair functions based at least some of the input patches of the input image, as shown in block 840. The processor 104 of the computing system 102 can execute the testing module 120 of the image manipulation application 116 to generate the output image. For each input patch of the input image, the testing module 120 can select an anchor point corresponding to the input patch. The testing module 120 can select a corresponding anchor point by generating a vector for representing the input patch in an x-y plane or other Euclidean space. The testing module 120 can determine which anchor point in the x-y plane or other Euclidean space is closest to the input patch.

Figure 9:
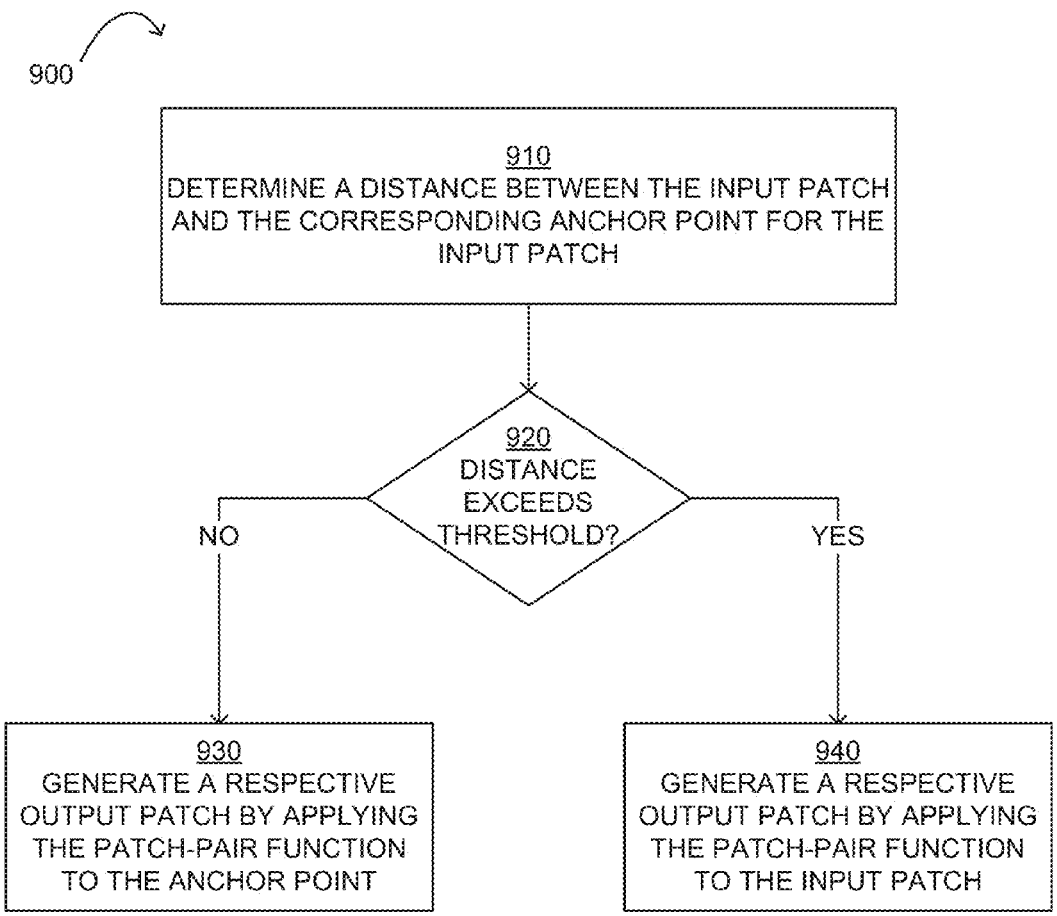
FIG. 9 is a flow chart illustrating an example method for generating an output image from an input image by applying a patch-pair function to either an anchor point of an input image or an input patch of the input image.

In some embodiments, the testing module 120 can determine whether a corresponding patch-pair function is to be applied on an anchor point of the input image representing a respective input patch of the input image or on the respective input patch itself. FIG. 9 is a flow chart illustrating an example method 900 for generating an output image from an input image by applying a patch-pair function to either an anchor point of an input image or an input patch of the input image. For illustrative purposes, the method 900 is described with reference to the system implementation depicted in FIG. 1. Other implementations, however, are possible.

The method 900 involves determining a distance between the input patch and the corresponding anchor point for the input patch, as shown in block 910. The processor 104 of the computing system 102 can execute the testing module 120 to determine the distance. The distance between the input patch and the anchor point can be the distance between the input patch and the anchor point as represented by vectors in an x-y plane or other Euclidean space.

The testing module 120 can identify the corresponding anchor point for a given input patch by any suitable process. For example, the testing module 120 can traverse a hierarchy 702 by executing a nearest-neighbor search algorithm with respect to the input patch, such as an exact nearest-neighbor search or an approximate nearest-neighbor search. Executing a nearest-neighbor search algorithm with respect to the input patch can output a leaf node of the hierarchy 702 that is an anchor point corresponding to the input patch.

The method 900 further involves determining whether the distance is greater than a threshold distance, as shown in block 920. The processor 104 of the computing system 102 can execute the testing module 120 to determining the distance is greater than a threshold distance. The threshold distance can be a sufficiently close distance that applying a patch-pair function to the anchor point can provide an output patch for the output image having a predefined level of quality. In some embodiments, a threshold distance can be experimentally determined by performing procedures for optimizing de-noising accuracy on a set of validation images.

If the distance between the input patch and the anchor point is not greater than the threshold distance, the method 900 further involves generating a respective output patch by applying the patch-pair function to the anchor point, as shown in block 930. If the distance between the input patch and the anchor point is greater than the threshold distance, the method 900 further involves generating a respective output patch by applying the patch-pair function to the input patch, as shown in block 940. The processor 104 of the computing system 102 can execute the testing module 120 to apply the patch-pair function to either the anchor point or the input patch.

Figure 10:
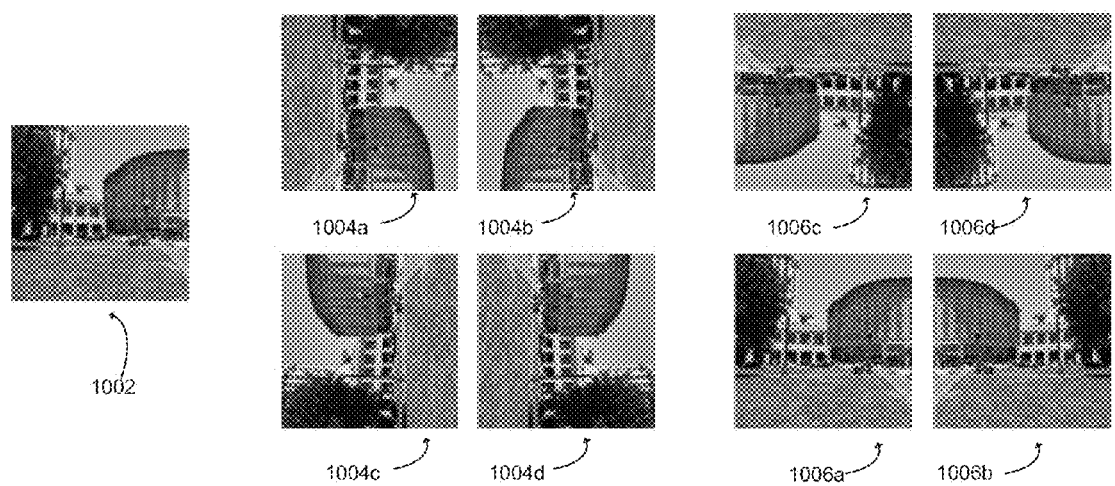
FIG. 10 is a modeling diagram depicting multiple variations of an input patch from an input image.

In additional or alternative embodiments, a shorter distance between vectors representing an input patch and a corresponding anchor point in an x-y plane can improve the quality of the output image. The testing module 120 can identify the shortest distance between vectors representing an input patch and a corresponding anchor point by analyzing multiple variations of each input patch. The input patch can be analyzed by performing operations such as rotating and flipping the input patch. For example, FIG. 10 depicts an input patch 1002 and multiple variations of the input patch 1002 used by the testing module 102. Variations 1004a-d depict rotations of the input patch 1002. Variations 1006a-d depict variations of the input patch 1002 obtained by flipping the input patch 1002. Variation 1006b represents input patch 1002 flipped along a vertical axis. Variation 1006c represents input patch 1002 flipped along both a vertical axis and a horizontal axis. Variation 1006c represents input patch 1002 flipped along a horizontal axis. The testing module 120 can apply a regression function or other patch-pair function on a variation of the input patch 1002 for which a distance is minimized between vectors representing the variation of the input patch 1002 and a corresponding anchor point.

In additional or alternative embodiments, multiple input patch pairs of the input image can overlap one another. The testing module 120 can apply a respective patch-pair function to each of the overlapping input patches to generate estimated output patches. The testing module 120 can average values for the overlapping portions of the estimated output patches to obtain a final output patch.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
generating, by an image manipulation application executed by a processing device, a plurality of training patch pairs comprising a plurality of training input patches and a plurality of training output patches, wherein each training patch pair comprises a respective training input patch from a training input image and a respective training output patch from a training output image, wherein the training input image and the training output image include at least some of the same image content;
determining, by the image manipulation application, a plurality of patch-pair functions from at least some of the plurality of training patch pairs, wherein each patch-pair function of the plurality of patch-pair functions corresponds to a modification to a respective training input patch to generate a respective training output patch;
receiving, by the image manipulation application, an input image; and
generating, by the image manipulation application, an output image from the input image by applying at least some of the plurality of patch-pair functions based on at least some of a plurality of input patches of the input image, wherein applying the at least some of the plurality of patch-pair functions based on the at least some of the plurality of input patches of the input image comprises, for each input patch of the at least some of the plurality of input patches:
determining a respective distance between the input patch and a respective anchor point from a plurality of anchor points, wherein the respective anchor point corresponds to a respective group of training input patches that includes the input patch;
determining whether the respective distance exceeds a threshold distance; and
performing at least one of:
applying the respective patch-pair function corresponding to the respective anchor point based on determining that the distance does not exceed the threshold distance; and
applying the respective patch-pair function corresponding to the input patch based on determining that the distance exceeds the threshold distance.

2. The method of claim 1, wherein each training input patch is represented by a multi-dimensional vector.

3. The method of claim 1, wherein determining the plurality of patch-pair functions comprises:
generating a hierarchy of the plurality of training input patches representing a plurality of groups of training input patches; and
determining the plurality of anchor points by selecting a plurality of leaf nodes from the hierarchy, wherein each anchor point represents a respective one of the plurality of groups of training input patches; and
determining a respective patch-pair function for each of the plurality of anchor points.

4. The method of claim 3, wherein generating the hierarchy comprises, for each level of a plurality of levels in the hierarchy specified by a depth factor for the hierarchy, determining a plurality of centroids, each centroid representative of a respective subset of the plurality of training input patches closest to the centroid, wherein the number of centroids for each level is specified by a branch factor for the hierarchy.

5. The method of claim 1, wherein determining the plurality of patch-pair functions comprises:
partitioning the plurality of training input patches into a plurality of groups of training input patches;
determining the plurality of anchor points, wherein each anchor point represents a respective one of the plurality of groups of training input patches; and
determining a respective patch-pair function for each of the plurality of anchor points.

6. The method of claim 5, wherein determining the plurality of patch-pair functions from at least some of the plurality of training patch pairs comprises applying a least squares algorithm to determine a relationship between a respective one of a respective group of training input patches represented by a respective anchor point and a corresponding training output patch.

7. The method of claim 5, wherein determining the plurality of patch-pair functions from at least some of the plurality of training patch pairs comprises applying a non-negative least squares algorithm to determine a relationship between a respective one of a respective group of training input patches represented by a respective anchor point and a corresponding training output patch.

8. A non-transitory computer-readable medium embodying program code executable by a processing device, the non-transitory computer-readable medium comprising:
program code for generating a plurality of training patch pairs comprising a plurality of training input patches and a plurality of training output patches, wherein each training patch pair comprises a respective training input patch from a training input image and a respective training output patch from a training output image, wherein the training input image and the training output image include at least some of the same image content;
program code for determining a plurality of patch-pair functions from at least some of the plurality of training patch pairs, wherein each of the plurality of patch-pair functions corresponds to a modification to a respective training input patch to generate a respective training output patch;
program code for receiving an input image; and
program code for generating an output image from the input image by applying at least some of the plurality of patch-pair functions based on at least some of a plurality of input patches of the input image, wherein applying the at least some of the plurality of patch-pair functions based on the at least some of the plurality of input patches of the input image comprises, for each input patch of the at least some of the plurality of input patches:
determining a respective distance between the input patch and a respective anchor point from a plurality of anchor points, wherein the respective anchor point corresponds to a respective group of training input patches that includes the input patch;
determining whether the respective distance exceeds a threshold distance; and
performing at least one of:
applying the respective patch-pair function corresponding to the respective anchor point based on determining that the distance does not exceed the threshold distance; and
applying the respective patch-pair function corresponding to the input patch based on determining that the distance exceeds the threshold distance.

9. The non-transitory computer-readable medium of claim 8, wherein determining the plurality of patch-pair functions comprises:
partitioning the plurality of training input patches into a plurality of groups of training input patches;
determining the plurality of anchor points, wherein each anchor point represents a respective one of the plurality of groups of training input patches; and
determining a respective patch-pair function for each of the plurality of anchor points.

10. The non-transitory computer-readable medium of claim 9, wherein determining the plurality of patch-pair functions from at least some of the plurality of training patch pairs comprises applying a least squares algorithm to determine a relationship between a respective one of a respective group of training input patches represented by a respective anchor point and a corresponding training output patch.

11. The non-transitory computer-readable medium of claim 9, wherein determining the plurality of patch-pair functions from at least some of the plurality of training patch pairs comprises applying a non-negative least squares algorithm to determine a relationship between a respective one of a respective group of training input patches represented by a respective anchor point and a corresponding training output patch.

12. A system comprising:
a processor configured to execute instructions stored in a non-transitory computer-readable medium;
wherein the instructions comprise an image manipulation application configured to perform operations comprising:
generating a plurality of training patch pairs comprising a plurality of training input patches and a plurality of training output patches, wherein each training patch pair comprises a respective training input patch from a training input image and a respective training output patch from a training output image, wherein the training input image and the training output image include at least some of the same image content;
determining a plurality of patch-pair functions from at least some of the plurality of training patch pairs, wherein each of the plurality of patch-pair functions corresponds to a modification to a respective training input patch to generate a respective training output patch;
receiving an input image; and
generating an output image from the input image by applying at least some of the plurality of patch-pair functions based on at least some of a plurality of input patches of the input image, wherein applying the at least some of the plurality of patch-pair functions based on the at least some of the plurality of input patches of the input image comprises, for each input patch of the at least some of the plurality of input patches:

determining a respective distance between the input patch and a respective anchor point from a plurality of anchor points, wherein the respective anchor point corresponds to a respective group of training input patches that includes the input patch;

determining whether the respective distance exceeds a threshold distance; and performing at least one of:
- applying the respective patch-pair function corresponding to the respective anchor point based on determining that the distance does not exceed the threshold distance; and
- applying the respective patch-pair function corresponding to the input patch based on determining that the distance exceeds the threshold distance.

13. The system of claim 12, further comprising an imaging device configured to record the input image, wherein the processor is configured to receive the input image from the imaging device.

14. The system of claim 12, wherein determining the plurality of patch-pair functions comprises:

partitioning the plurality of training input patches into a plurality of groups of training input patches, wherein partitioning the plurality of training input patches into the plurality of groups of training input patches comprises generating a hierarchy of the plurality of training input patches;

determining the plurality of anchor points by selecting a plurality of leaf nodes from the hierarchy, wherein each anchor point represents a respective one of the plurality of groups of training input patches; and determining the respective patch-pair function for each of the plurality of anchor points.

* * * * *